July 14, 1925. 1,546,064
F. FOCHER, JR
DIFFERENTIAL LOCK
Filed Sept. 3, 1924 5 Sheets-Sheet 1
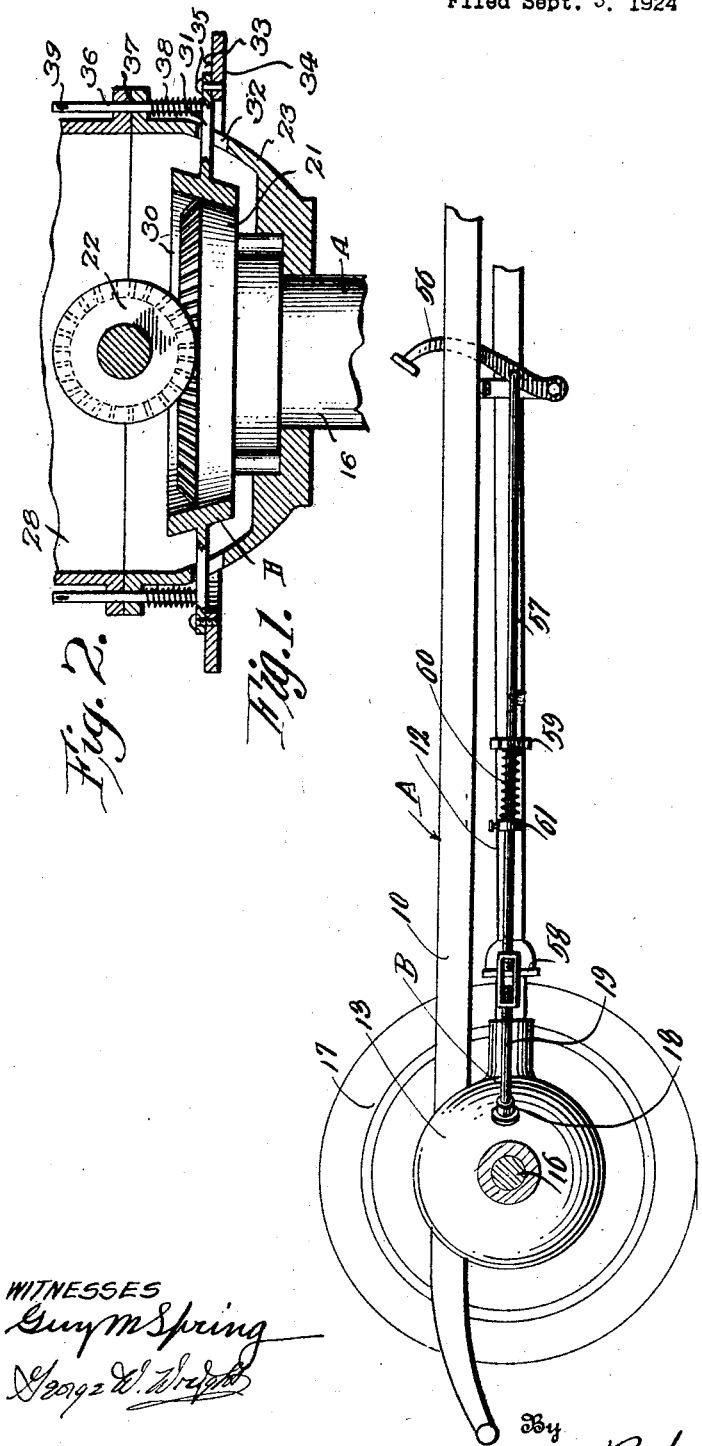
WITNESSES
Guy M Spring
Inventor
FRANK FOCHER, JR.
By
Richard B Owen Attorney

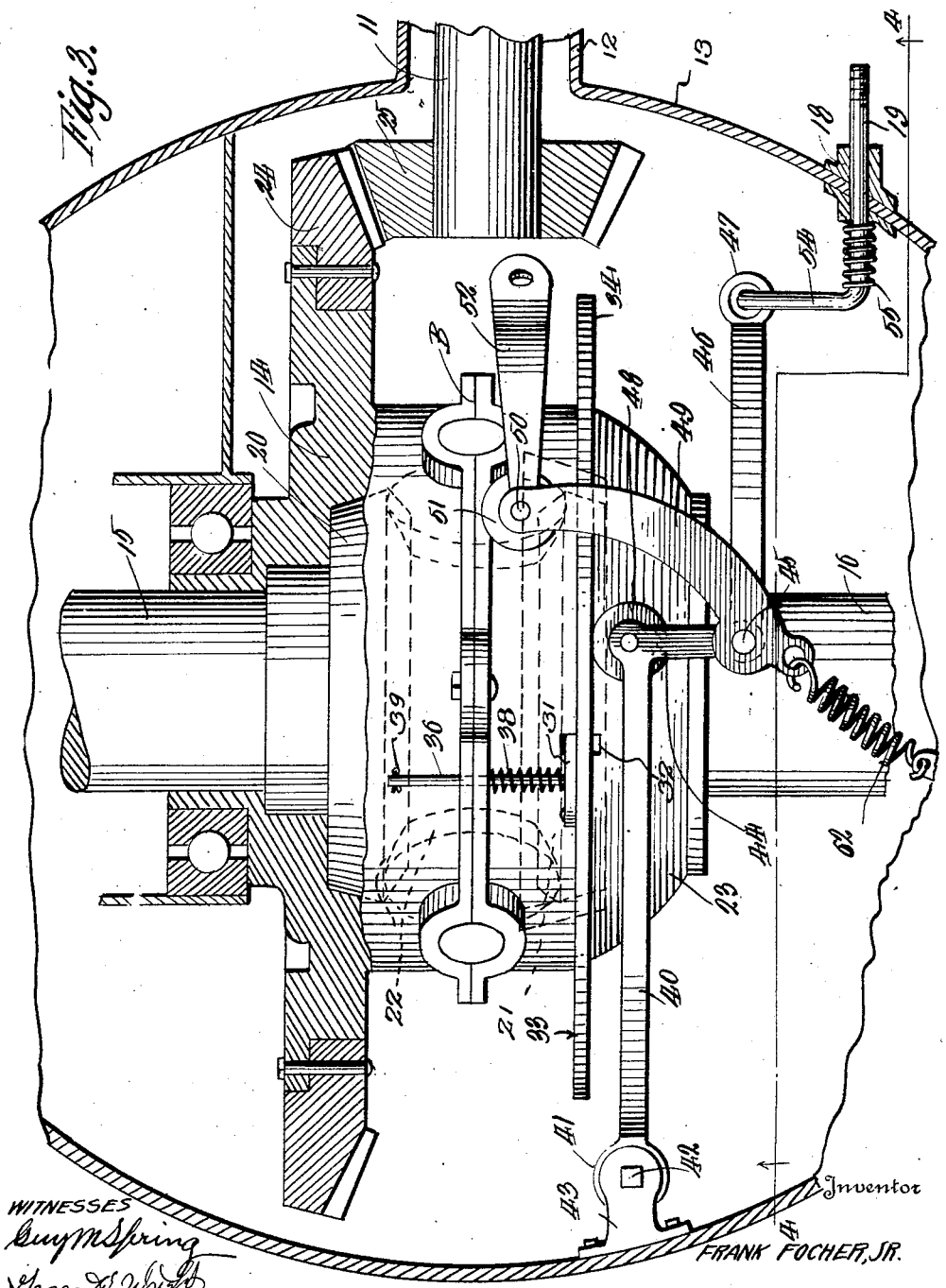

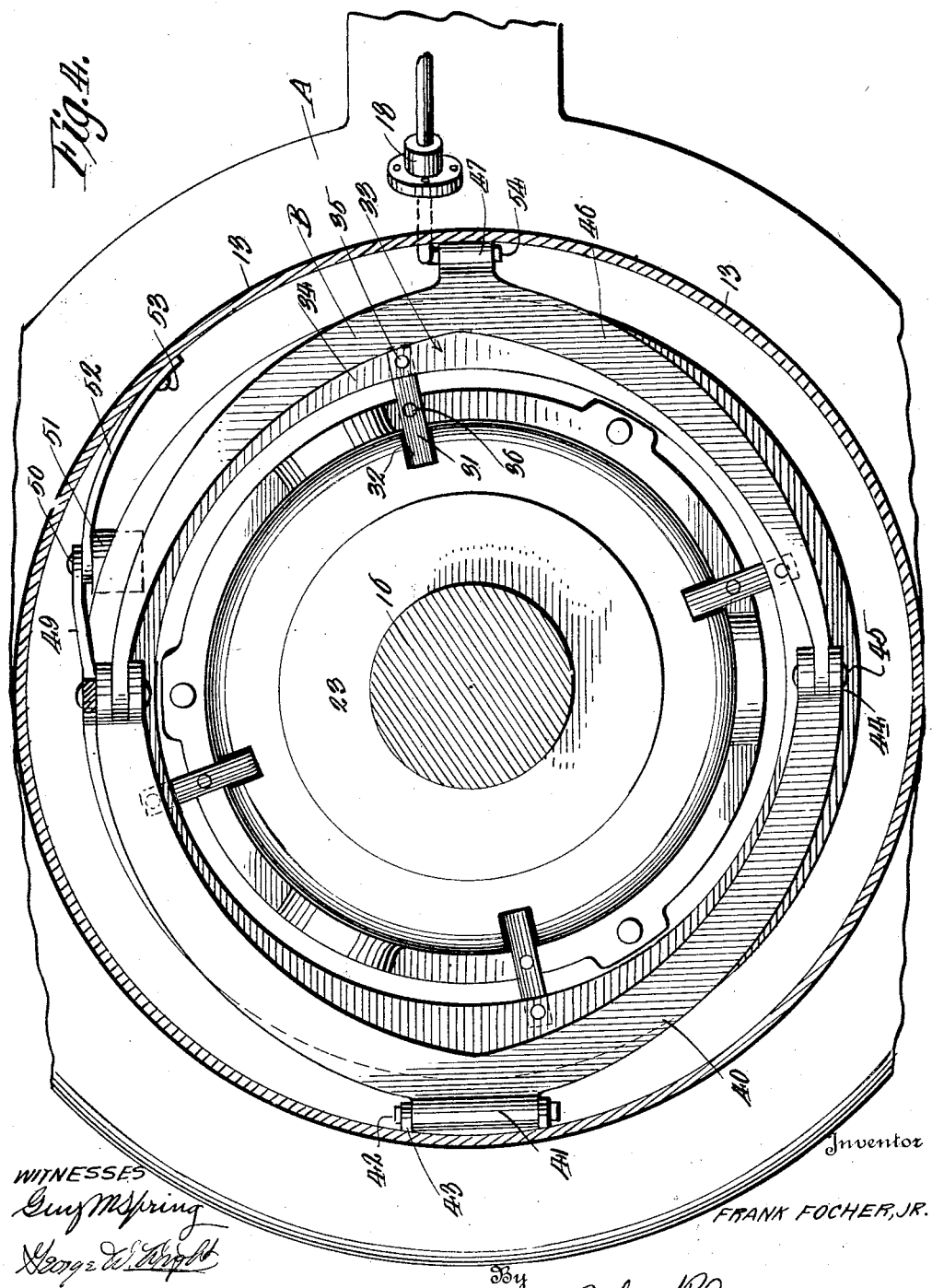

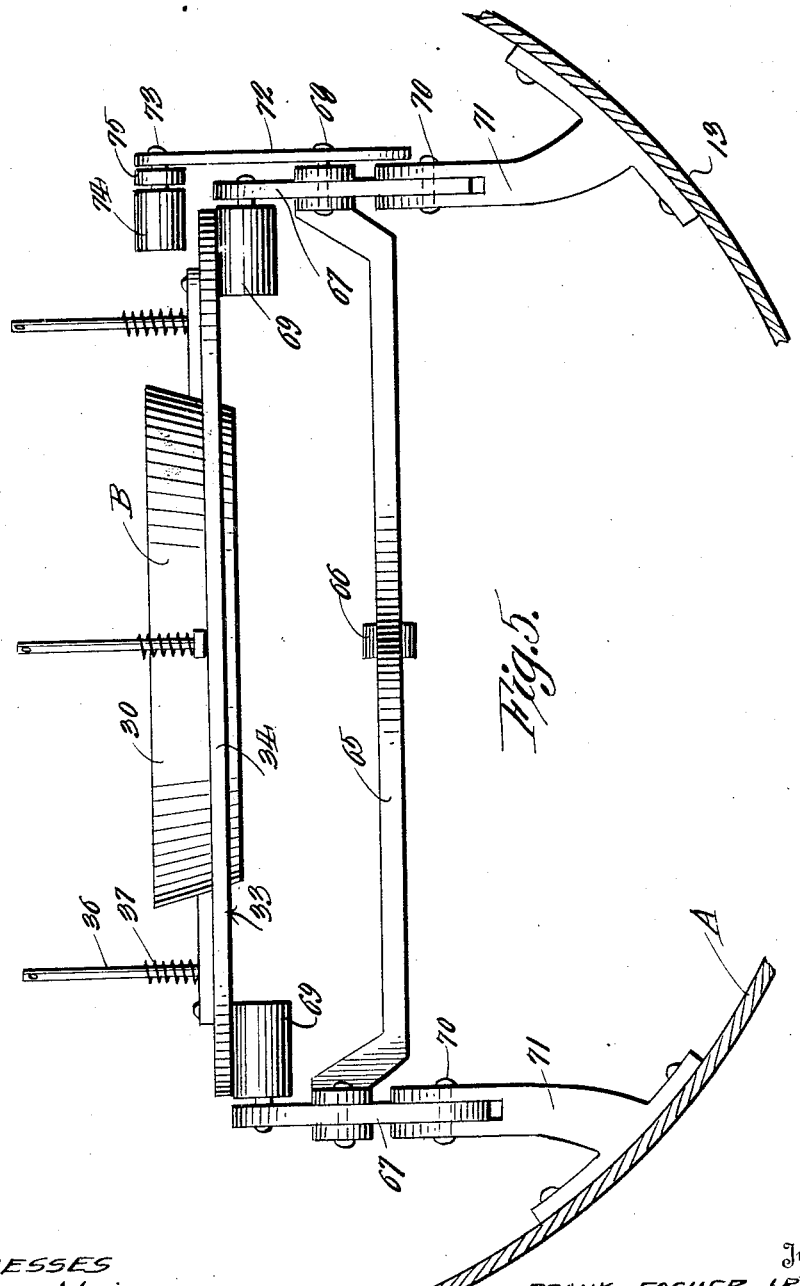

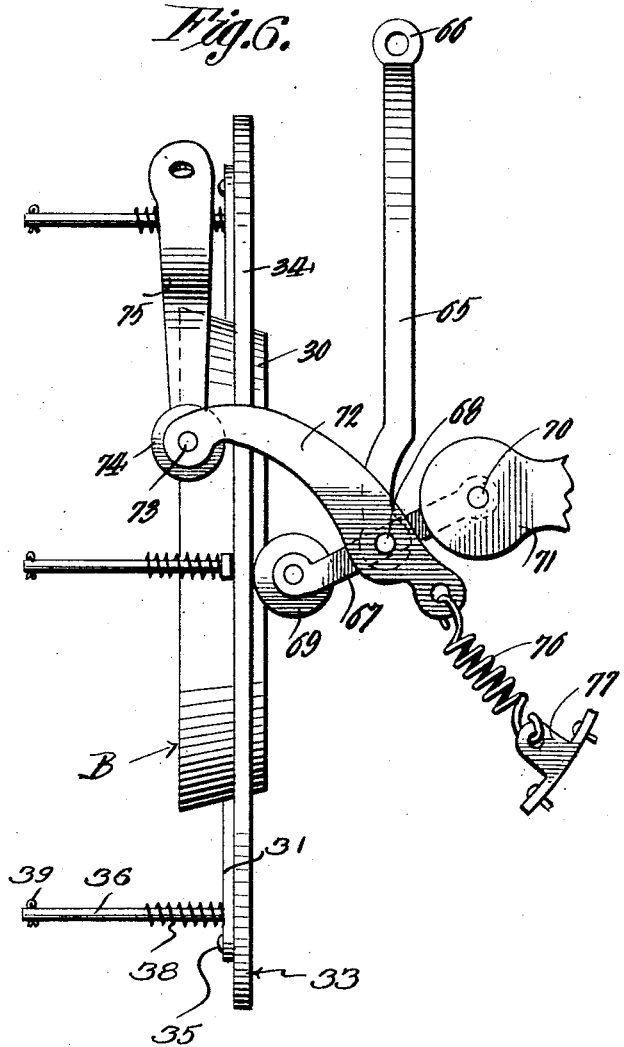

Patented July 14, 1925.

1,546,064

UNITED STATES PATENT OFFICE.

FRANK FOCHER, JR., OF ROY, MONTANA.

DIFFERENTIAL LOCK.

Application filed September 3, 1924. Serial No. 735,686.

*To all whom it may concern:*

Be it known that I, FRANK FOCHER, Jr., a citizen of the United States, residing at Roy, in the county of Fergus and State of Montana, have invented certain new and useful Improvements in Differential Locks, of which the following is a specification.

This invention appertains to motor vehicles and more particularly to a novel attachment for the differential thereof.

The primary object of the present invention is to provide a novel means operable from the driver's seat of the automobile for locking the sections of the rear drive axle together, so as to facilitate the driving out of mud holes and the like.

Another object of the invention is the provision of a novel cone clutch ring slidably carried by the gear casing of the differential for engaging one of the drive gears of the drive axle and the differential pinion, and novel means for operating the said cone clutch ring.

A further object of the invention is the provision of novel means for mounting the cone clutch ring in the gear casing and novel means for normally holding the cone clutch ring out of engagement with the drive gear on one of the axle sections.

A still further object of the invention is to provide a novel differential lock of the above character, which will be durable and efficient in use, one that will be simple and easy to manufacture, and one which can be placed upon the market and incorporated with a standard differential at a small cost.

With these and other objects in view, the invention consists in the novel construction, arrangement and formation of parts, as will be hereinafter more specifically described, claimed, and illustrated in the accompanying drawings, in which drawings:

Figure 1 is a fragmentary side elevation of an automobile chassis, showing parts thereof broken away and illustrating the novel attachment incorporated therewith.

Figure 2 is a detail fragmentary section through the differential, showing the gear casing in section with the improved lock incorporated therewith and illustrating the means of incorporating the clutch ring with the gear casing and the novel carrier for the ring, Figure 3 is a horizontal section through the differential showing the improved lock incorporated therewith, Figure 4 is a vertical section through the differential showing the lock taken on the line 4—4 of Figure 3, looking in the direction of the arrows, Figure 5 is a horizontal section showing a slightly modified form of means for actuating the carrier for the cone clutch ring, and Figure 6 is a detailed side elevation showing the modified form of the means for operating the carrier for the cone clutch ring.

Referring to the drawings in detail, wherein similar reference characters designate corresponding parts throughout the several views, the letter A generally indicates an automobile chassis which comprises the usual longitudinal channel beams 10, the propeller or drive shaft 11 rotatably mounted in a casing 12 and leading into the differential housing 13 which supports a differential 14 for the axle sections 15 and 16. These axle sections 15 and 16 have secured thereto in the usual way the rear drive ground wheels 17. The differential 14 and the housing 13 are of the usual or any preferred construction and in accordance with this invention the inner wall of the housing 13 is provided with an opening and a registering bearing sleeve 18 for an operating rod 19, the purpose of which will be hereinafter more fully described.

As heretofore stated the differential 14 is of the usual construction and includes the differential gears 20 and 21 which are keyed or otherwise secured to the inner ends of the axle sections 15 and 16. The differential gears 20 and 21 have meshing therewith the differential pinions 22 which are rotatably carried by the sectional gear casing 23. The sectional gear casing 23 carries the differential driving gear 24 which meshes with the differential drive pinion 25 carried by the drive or propeller shaft 11.

The improved attachment or differential lock is generally indicated by the reference character B and comprises a cone clutch ring 30 which is adapted to encircle the differential gear 21 and pinions 22 and to be moved into binding contact therewith at the desired time. The cone clutch ring 30 is provided with a plurality of radially extending arms 31 which extend through slots 32 formed in the sectional gear casing 23. These slots 32 permit movement of the cone clutch ring 30 toward and away from the end wall of the gear casing whereby the clutch ring can be easily moved into and out of binding contact with the said differential gear 21. The cone clutch ring 30 is supported in place by a novel carrier 33 which comprises a carrier ring 34 arranged exteriorly of the casing 23 and connected by means of suitable fastening elements 35 with the terminals of the arms 31. Extending laterally from the arms 31 are guide rods 36 which slidably extend through suitable guide openings 37 formed in the abutting flanges of the sections of the gear casing 23. These rods 36 can have coiled around the same suitable expansion springs 38 which are confined between the arms 31 and the flanges of the sectional gear casing and these springs normally tend to urge the cone clutch ring from out of binding contact with the differential gear 21 and pinions 22. As shown the terminals of the guide rods 36 carry suitable cross pins 39 so as to prevent the accidental removal of the rods from the gear casing.

The operating means for the clutch cone ring 30 is located interiorly of the differential housing 13 and includes a substantially semi-circular supporting ring having formed on its rear edge at the central portion thereof a hinge barrel 41 which receives a suitable hinge pintle 42. This hinge pintle 42 is carried by bearing ears 43 formed on the interior of the housing 13 at the rear end thereof. The inner ends of the supporting yoke 40 extend substantially to the vertical diametric center of the differential and have formed thereon the right angularly extending arms 44. The outer terminals of the arms have pivotally connected thereto by means of bearing pins 45 the inner ends of a substantially U-shaped or semi-circular shaped operating yoke 46, the central portion of which is provided with a bearing barrel 47. Now it is to be noted at this time that the inner end of the supporting yoke 40 has bearing rollers 48 which are adapted to engage the outer face of the carrier or track ring 34. Rockably mounted on one of the bearing pins 45 at its outer terminal is a U-shaped lever 49 the inner end of which carries a stub shaft 50 on which is rotatably mounted a bearing roller 51 for engaging the inner face of the carrier ring 34. The shaft 50 has rockably mounted thereon the inner end of a supporting lever 52 which is in turn pivoted as at 53 to the inner face of the differential housing 13 at the forward end thereof.

The operating rod 19 has its inner end provided with an arm 54 which is loosely mounted in the barrel 47 carried by the operating yoke 46. A coil spring 55 can be coiled about the inner end of the rod, as shown in Figure 3, if so desired.

It is desired of course to operate the yoke 46 from the driver's seat of the automobile and in order to bring this about a foot pedal 56 is rockably mounted on the frame adjacent to the driver's seat and this pedal has operatively connected thereto a rearwardly extending rod 57 which is adjustably connected with the rod 19 by means of a suitable turnbuckle or the like 58 whereby the slack can be taken up. As shown the rod 57 is carried by bearings 59. An expansion spring 60 is coiled about the rod and is disposed between the bearings 59 and a stop collar 61 secured to the rod. In operation of the improved device, when it is desired to lock the differential in order that the axle sections 15 and 16 can rotate together, the pedal 56 is pressed forwardly, which will of course exert a forward pull on the rods 57 and 19. The pull on the rod 19 will tend to pull the operating yoke 46 forwardly which will push inward on the supporting yoke 40 causing the rollers 48 to push the ring 34 inwardly carrying the clutch cone ring 30 in binding contact with the differential gear 21 and the differential pinions 22. This will lock the gear 21 with the gear casing 23 and the differential pinions 22 thereby effectively locking the axle sections 15 and 16 together causing the synchronous rotation thereof. This is, of course, a recognized advantage in driving over slippery streets, out of mud holes and the like.

When pressure is released from the foot pedal 56 the spring 60 will tend to normally return the rods 57 and 19 to their normal positions permitting the contractile coil spring 62, which has its opposite terminals connected respectively with the outer end of the lever 45 and the differential housing 13 to draw in on the lever 49 and the supporting yoke 40 causing the roller 51 to push the carrier ring 34 outwardly and the cone clutch ring out of engagement with the differential gear 21 and the differential pinions 22.

In Figures 5 and 6 I have shown a slightly modified form of operating means for the carrier ring 34 and the clutch cone ring 30. In this instance the operating means includes a semi-circular operating yoke 65 provided at its forward central portion with a hinge barrel 66, which hinge barrel is adapted to receive the arm 54 on the pull rod 19. The inner terminals of the yoke 65 have pivotally secured thereto at a point intermediate their ends arms 67 by means of pivot pins 68. The inner terminals of these arms carry bearing rollers 69 which engage the outer face of the carrier ring 34. The outer terminals of the arm 67 are rockably mounted on pivot pins 70 carried by bearing lugs 71 rigidly connected with the differential housing 13. One of the pivot pins 68 has rockably mounted thereon a lever 72 the inner end of which supports a shaft 73 on which is rotatably mounted a bearing roller 74 for engaging the inner surface of the carrier ring 34. This shaft 73 has also rockably mounted thereon a lever 75 the outer end of which is secured to the differential housing. The outer end of the lever 72 has connected thereto a contractile coil spring 76 the inner end of which is connected to a bracket 77 which is adapted to be riveted to the differential housing. This spring 76 normally tends to draw the roller 74 into engagement with the carrier ring for urging the ring outwardly thereby normally tending to move the cone clutch ring from out of binding contact with the differential gear 21 and pinions 22. When it is desired to lock the differential it is merely necessary to operate the pedal as in the first form which will pull the yoke 65 forwardly forcing the roller 69 into contact with the carrier ring 34, thereby moving the clutch cone ring in binding contact with the gear 21 and pinions 22.

From the foregoing description, it can be seen that I have provided an exceptionally simple and durable device for bringing about the locking of the differential of an automobile in a simple and easy manner when necessary or desirable.

Changes in details may be made without departing from the spirit or the scope of this invention, but,

What I claim as new is:

1. The combination with a differential including a housing, axle sections rotatably extending into said housing, spaced differential gears secured to the inner ends of the axle sections, differential pinions meshing with the differential gears, a gear casing rotatable around the differential gears, rotatably carrying said pinions and means for driving said casing, of a lock for the differential including a cone clutch slidably mounted within the gear casing, a carrier ring arranged exteriorly of the gear casing rigidly connected with the cone clutch, means for normally urging the cone clutch and carrier ring away from the differential gear, and means for urging the cone clutch in binding contact with said differential gear against the tension of said spring means.

2. The combination with a differential including spacing differential gears, intermeshing differential pinions and a drive means for said pinions, of a differential lock including a cone clutch ring arranged for movement toward and away from one of said differential gears, a carrier ring for the clutch ring, supporting rods connected with the carrier ring and the clutch ring slidably carried by the driving means for the differential pinions, bearing rollers engaging the opposite sides of the carrier ring, spring means for normally urging one of the rollers on one side of the carrier ring into engagement therewith for moving the clutch ring out of engagement with the said gear, and means for moving the roller on the opposite side of the carrier ring in engagement therewith for causing movement of the clutch ring in binding engagement with the said differential gear.

3. The combination with a differential including a pair of spacing differential gears, intermeshing differential pinions and a drive means for the pinions, of a lock for the differential including a cone clutch ring arrangement for movement toward and away from one of said differential gears, a carrier and track ring connected with the clutch ring, supporting means connected with the clutch ring and the track and carrier ring slidably associated with the driving means for the differential pinions, bearing rollers arranged on opposite sides of the track and carrier ring, an operating yoke operatively connected to the bearing roller on one side of the ring, means for operating the yoke including a foot pedal, a pair of operating levers pivotally connected together and supporting the other roller at the point of connection, means for rockably connecting one of the levers to the operating yoke, and means for rockably connecting the other lever to a rigid portion of the differential.

4. The combination with a differential including a housing, axle sections rotatably extending into said housing, spacing differential gears secured to the inner ends of the axle sections, differential pinions meshing with said differential gears, a gear casing rotatable around the differential gears, rotatably carrying said pinions, means for driving said casing, of a lock for the differential including a cone clutch slidably mounted within the gear casing, a track ring arranged exteriorly of the gear casing rigidly connected with the cone clutch, means for slidably connecting the track ring and cone clutch with the gear casing, bearing rollers disposed on each side of the track ring, spring means for normally urging the roller on one side of the track ring into engagement therewith for moving the clutch ring out of engagement with one of the differential gears and differential pinions, and means including a foot pedal for moving the roller on the other side of the track ring into engagement therewith for moving said clutch ring into binding engagement with said mentioned differential gear and differential pinions.

5. The combination with a differential including a differential housing, a pair of spacing differential gears, differential pinions meshing therewith, a rotatable gear casing rotatably supporting the pinions, means for driving the casing, of a lock for the differential including a cone clutch ring slidably carried by the gear casing arranged for movement toward and away from said differential gears, a track ring rigidly connected with the clutch ring arranged exteriorly of the gear casing, a pair of pivotally connected levers, a roller carried by the levers at the point of connection arranged on one side of the track ring, means for pivotally connecting the inner end of the innermost lever to the housing, spring means for connecting the outer end of the outermost lever to the housing for normally urging the roller into engagement with said ring, a roller arranged on the other side of the ring, and means for urging the roller into engagement with the ring including a foot pedal.

In testimony whereof I affix my signature in the presence of two witnesses.

FRANK FOCHER, Jr.

Witnesses:
GEO. STAPLES,
F. B. STEVENS.